(12) United States Patent
Zhou

(10) Patent No.: US 11,874,562 B2
(45) Date of Patent: Jan. 16, 2024

(54) COMPONENT FOR DISSIPATING HEAT OF DEVICE, BACKLIGHT MODULE, AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Shixin Zhou, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 121 days.

(21) Appl. No.: 17/621,802

(22) PCT Filed: Dec. 13, 2021

(86) PCT No.: PCT/CN2021/137560
§ 371 (c)(1),
(2) Date: Dec. 22, 2021

(87) PCT Pub. No.: WO2023/102957
PCT Pub. Date: Jun. 15, 2023

(65) Prior Publication Data
US 2023/0176423 A1 Jun. 8, 2023

(30) Foreign Application Priority Data
Dec. 7, 2021 (CN) .......................... 202111485001.6

(51) Int. Cl.
*G02F 1/00* (2006.01)
*G02F 1/1335* (2006.01)
(Continued)

(52) U.S. Cl.
CPC ...... *G02F 1/133628* (2021.01); *C08F 220/56* (2013.01); *G02F 1/133603* (2013.01)

(58) Field of Classification Search
CPC .................................................... H05K 7/2039
See application file for complete search history.

(56) References Cited

U.S. PATENT DOCUMENTS

| | | | |
|---|---|---|---|
| 11,287,698 B2 * | 3/2022 | Hori | ........................ F21V 29/56 |
| 2013/0003353 A1 * | 1/2013 | Kim | ..................... G02B 6/0021 |
| | | | 362/97.1 |

(Continued)

FOREIGN PATENT DOCUMENTS

| CN | 101023147 A | 8/2007 |
|---|---|---|
| CN | 102889507 A | 1/2013 |

(Continued)

*Primary Examiner* — Gerald J Sufleta, II
(74) *Attorney, Agent, or Firm* — Mark M. Friedman

(57) ABSTRACT

A component for dissipating heat of a device, a backlight module, and a display panel are disclosed. The component for dissipating heat of the device includes a first elastic body and a heat dissipation apparatus, and a first temperature threshold is set. The component for dissipating heat of the device dissipates heat of the device and ensures heat insulation of the device by a physical method, and does not include a sensor or a logic circuit. Therefore, it has low cost and eco-friendly applications, and does not consume electrical power.

17 Claims, 4 Drawing Sheets

(51) Int. Cl.
      *C08F 220/56*     (2006.01)
      *G02F 1/13357*   (2006.01)

(56) References Cited

U.S. PATENT DOCUMENTS

2013/0021780 A1*   1/2013   Jung .................... G02B 6/0088
                                                                            362/97.1
2022/0336251 A1*  10/2022   Jain ..................... H01L 21/6835

FOREIGN PATENT DOCUMENTS

| | | |
|---|---|---|
| CN | 103261786 A | 8/2013 |
| CN | 208239765 U | 12/2018 |
| CN | 111963926 A | 11/2020 |
| CN | 111981364 A | 11/2020 |
| CN | 113115559 A | 7/2021 |
| CN | 113741095 A | 12/2021 |
| JP | H07335015 A | 12/1995 |
| JP | 2004287190 A | 10/2004 |
| JP | 2016162912 A | 9/2016 |
| WO | 2012176698 A1 | 12/2012 |

\* cited by examiner

COMPONENT FOR DISSIPATING HEAT OF DEVICE, BACKLIGHT MODULE, AND DISPLAY PANEL

FIELD

The present disclosure relates to a field of display technologies, and more particularly, to a component for dissipating heat of a device, a backlight module, and a display panel.

BACKGROUND

A polymer stabilized vertical alignment (PS-VA) is one of technologies that is applied to thin-film transistor liquid crystal display (TFT-LCDs). As a main functional module/component of LCD products, LCD modules are commonly formed from an LCD panel, a backlight component, a control driving plate, a connecting support structure, which are assembled to each other, and have a comprehensive LCD function. Backlight units of the LCD modules are a backlight module formed from a light source, an optical plate/film, a backplate structure, and other support/fixing auxiliary material, which are assembled to each other.

Backlight units are a light source module and emit light by a light-emitting diode (LED) lamps. When large-scale display panels emit high-brightness light, a temperature of an area surrounding the LED lamps will be overly-high during a light-emitting process due to high power of the LED lamps. Therefore, heat is difficult to be dissipated, causing bad display performance of the display panels.

When display panels are used in an extremely cold environment, a temperature of an area surrounding part of LED lamps of backlight units will be overly-low, leading to an abnormal working temperature. Therefore, a display effect of the display panels is deteriorated due to a color shift of a display image, affecting a lifespan of the LED lamps.

SUMMARY

A goal of the present disclosure is to solve a poor heat dissipation issue of LED lamps disposed in a light source of display panels.

To achieve the above goal, the present disclosure provides a component for dissipating heat of a device, comprising: a first elastic body; a heat dissipation apparatus disposed on the first elastic body, wherein the first elastic body supports the heat dissipation apparatus; wherein when a temperature is higher than a first temperature threshold, the first elastic body drives the heat dissipation apparatus to move toward a direction close to a heat supplier; and when a temperature is lower than the first temperature threshold, the first elastic body drives the heat dissipation apparatus to move toward a direction away from the heat supplier.

Optionally, the first elastic body is a memory liquid crystal elastic body.

Optionally, the component for dissipating heat of the device further comprises: a hydrogel disposed on a surface of the heat dissipation apparatus away from the first elastic body; wherein when a temperature is higher than a second temperature threshold, moisture of the hydrogel is released to dissipate heat; and when a temperature is lower than the second temperature threshold, the hydrogel stops releasing moisture.

Optionally, an absolute value of a difference between the second temperature threshold and the first temperature threshold ranges from 0° C. to 1° C.

Optionally, the hydrogel comprises following substances: an acrylamide monomer, a cross-linking agent, and an ultraviolet (UV) photoinitiator, wherein a molar ratio of the acrylamide monomer, the cross-linking agent, and the UV photoinitiator is 2000:1:2.

Optionally, a method of manufacturing the hydrogel comprises following steps:
obtaining a mixing solution comprising the substances of he above hydrogel;
irradiating the mixing solution with UV light to obtain acrylamide hydrogel;
immersing the acrylamide hydrogel in deionized water until the acrylamide hydrogel is completely swelled;
drying the swelled acrylamide hydrogel until the swelled acrylamide hydrogel is dehydrated; and
immersing the dehydrated acrylamide hydrogel in a mixing solution comprising potassium ferricyanide and lithium bromide or in a mixing solution comprising potassium ferrocyanide and lithium bromide until the dehydrated acrylamide hydrogel is completely swelled. Optionally, wherein the component for dissipating heat of the device further comprises: at least one second elastic body disposed on a surface of the heat dissipation apparatus away from the first elastic body; wherein when a temperature is higher than a third temperature threshold, the at least one second elastic body drives the heat dissipation apparatus to move toward a direction close to the heat supplier; and when a temperature is lower than the third temperature threshold, the at least one second elastic body drives the heat dissipation apparatus to move toward a direction away from the heat supplier.

Optionally, the second elastic body comprises a negative thermal expansion (NTE) material.

Optionally, an absolute value of a difference between the third temperature threshold and the first temperature threshold ranges from 0° C. to 1° C.

Optionally, the NTE material comprises following substances: polycrystalline powder, an epoxy resin, and a curing agent, the polycrystalline powder comprises a polycrystalline product and a wet medium, the polycrystalline product comprises gallium, manganese, and manganese nitride, and a molar ratio of the gallium, the manganese, and the manganese nitride is 1:2:1.

Optionally, the wet medium comprises zirconia and alcohol.

Optionally, a method of manufacturing the NTE material comprises following steps:
obtaining a mixing material comprising the substances of the above NTE material;
sintering and annealing the mixing material under a vacuum condition and a hermetic seal condition;
cooling the mixing material to a room temperature, grinding the mixing material, and sintering the mixing material under a vacuum condition and a hermetic seal condition to form the polycrystalline product;
mixing the polycrystalline product with the wet medium, and performing a ball milling process to obtain the polycrystalline powder; and
mixing the polycrystalline powder with the epoxy resin, and performing a stirring process, a degassing process, and a curing process to obtain the NTE material.

To achieve the above goal, the present disclosure further provides a backlight module, comprising a backplate, a plurality of light-emitting diode (LED) lamps disposed on a surface of the backplate, and at least one of the component for dissipating heat of the above device disposed on a surface of the backplate away from the LED lamps, wherein each of the at least one of the component for dissipating heat of the device corresponds to one of the LED lamps.

To achieve the above goal, the present disclosure further provides a display panel, comprising the above backlight module.

Regarding the beneficial effects: the present disclosure provides a component for dissipating heat of a device, a backlight module, and a display panel. The component for dissipating heat of the device comprises a first elastic body and a heat dissipation apparatus, and a first temperature threshold is set. When a temperature is higher than the first temperature threshold, a first elastic body is shrunk to drive a heat dissipation apparatus to move upward, thereby making the heat dissipation apparatus close to the device to dissipate heat of a heat supplier. When a temperature is lower than the first temperature threshold, the first elastic body is softened to drive the heat dissipation apparatus to move away from the device to ensure heat insulation of the device, thereby realizing automatic heat dissipation of the device and heat insulation of the device. The component for dissipating heat of the device dissipates heat of the device and ensures heat insulation of the device by a physical method, and does not include a sensor or a logic circuit. Therefore, it has low cost and eco-friendly applications, and does not consume electrical power.

DESCRIPTION OF DRAWINGS

Technical solutions and beneficial effects of the present disclosure are illustrated below in detail in conjunction with drawings and specific embodiments.

Figure 1:
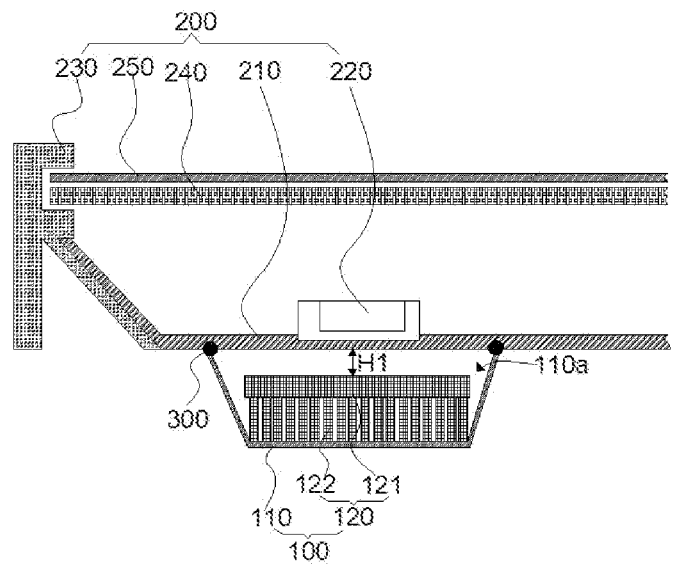
FIG. 1 is a structural schematic view showing a component for dissipating heat of a device according to an embodiment of the present disclosure.

Reference numbers of elements as shown in drawings are as follows:

component 100, 100', and 100" for dissipating heat of device; first elastic body 110; concave cavity 110a; heat dissipation apparatus 120; main body 121; wing plate 122; hydrogel 130, second elastic body 140, backlight module 200, backplate 210, LED lamp 220, frame 230, diffusion plate 240, optical film 250, and connecting component 300.

DETAILED DESCRIPTION

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

The present disclosure provides a component for dissipating heat of a device, a backlight module, and a display panel. The component for dissipating heat of the device comprises a first elastic body and a heat dissipation apparatus, and a first temperature threshold is set. When a temperature is higher than the first temperature threshold, a first elastic body is shrunk to drive a heat dissipation apparatus to move upward, thereby making the heat dissipation apparatus close to a device to dissipate heat of a heat supplier.

When a temperature is lower than the first temperature threshold, the first elastic body is softened to drive the heat dissipation apparatus to move away from the device to ensure heat insulation of the device, thereby realizing automatic heat dissipation of the device and heat insulation of the device. The component for dissipating heat of the device dissipates heat of the device and ensures heat insulation of the device by a physical method, and does not include a sensor or a logic circuit. Therefore, it has low cost and eco-friendly applications, and does not consume electrical power. Typically, the component for dissipating heat of the device can dissipate heat of backlight modules of large-scale display panels which may be a display terminal such as a display device, a television, or a display screen.

Figure 2:
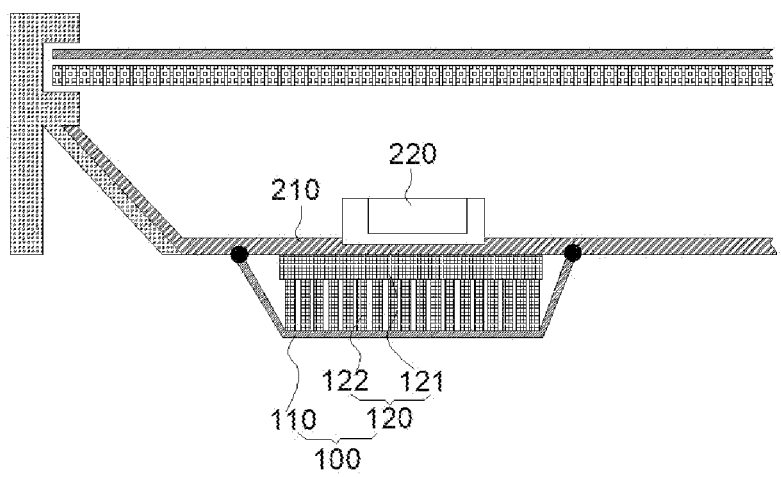
FIG. 2 is a structural schematic view showing the component for dissipating heat of the device according to the embodiment of the present disclosure during a heat dissipation process.
Figure 3:
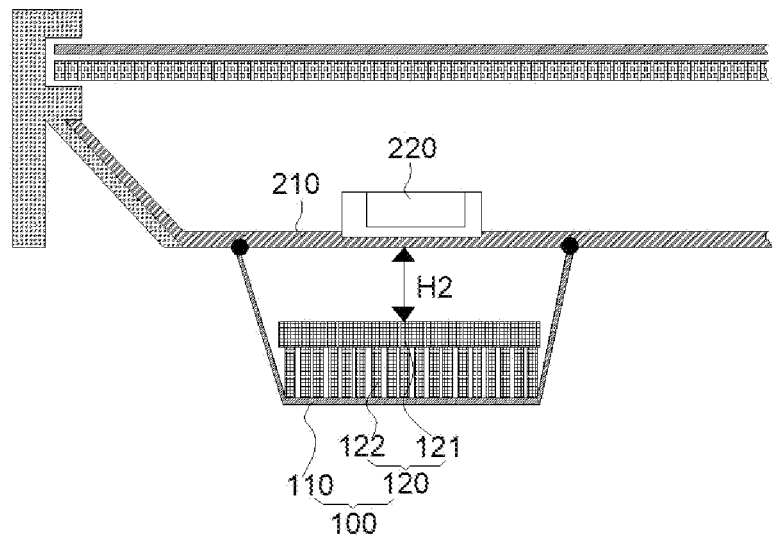
FIG. 3 is a structural schematic view showing the component for dissipating heat of the device according to the embodiment of the present disclosure during a heat insulation process.

In one embodiment of the present disclosure, as shown in FIG. 1 to FIG. 3, a component 100 for dissipating heat of a device includes a first elastic body 110 and a heat dissipation apparatus 120. The heat dissipation apparatus 120 is disposed on the first elastic body 110. The component 100 for dissipating heat of the device can be applied to a backlight module 200 of display panels such as thin-film transistor liquid crystal displays (TFT-LCDs). The backlight module 200 includes a backplate 210, a plurality of light-emitting diode (LED) lamps 220 disposed on a surface of the backplate 210, and a frame 230 connected to an end of the backplate 210. A diffusion plate 240 and an optical film 250, which are stacked, are disposed on the LED lamps 220. During applications, as shown in FIG. 1, the component 100 for dissipating heat of the device is disposed on a surface of the backplate 210 away from the LED lamps 220 by the first elastic body 110. One component for dissipating heat of the device 100 corresponds to at least one LED lamp 220. In the present embodiment, one component for dissipating heat of the device 100 corresponds to one LED lamp 220. The component 100 for dissipating heat of the device is disposed on the backplate 210 corresponding at least part of the LED lamps 220 which are heat suppliers.

Two ends of the first elastic body 110 are respectively and detachably connected a surface of the backplate 210 away from the LED lamps 220, Specifically, a detachable connection can be realized by anchoring or hooking, A middle part of the first elastic body 110 is depressed to form a concave cavity 110a. A heat dissipation apparatus 120 is disposed in the concave cavity 110a. Meanwhile, the first elastic body 110 is in a normal state. That is, the first elastic body 110 is neither shrunk nor expanded. The heat dissipation apparatus 120 includes a main body 121 and a plurality of wing plates 122 protruding from a surface of the main body 121. In the normal state, a distance between the main body 121 of the heat dissipation apparatus 120 and a corresponding surface of the backplate 210 is H1.

The first elastic body 110 is a memory liquid crystal elastic body. The memory liquid crystal elastic body has a first temperature threshold T1. When a temperature is lower than the first temperature threshold T1, the first elastic body 110 is softened and has good stretchability. When a temperature is higher than the first temperature threshold T1, the first elastic body 110 is hardened and is shrunk, Specifically, in the present embodiment, when a temperature of the LED lamps 220 corresponding to the component 100 for dissipating heat of the device is equal to the first temperature threshold T1, the first elastic body 110 and the component 100 for dissipating heat of the device are in a normal state, As shown in FIG. 2. When a temperature of the LED lamps 220 corresponding to the component 100 for dissipating heat of the device is higher than the first temperature threshold T1, heat of the backlight module 200 needs to be dissipated. The first elastic body 110 is hardened and shrunk to drive the heat dissipation apparatus 120 to move upward. That is, the first elastic body 110 drives the heat dissipation apparatus 120 to move toward a direction close to the LED lamps 220. The main body 121 of the heat dissipation apparatus 120 is attached to a surface of the backplate 210 away from the LED lamps 220, thereby dissipating heat of the LED lamps 220. The component 100 for dissipating heat of the device enters a heat dissipation state.

As shown in FIG. 3. When a temperature of the LED lamps 220 corresponding to the component 100 for dissipating heat of the device is lower than the first temperature threshold T1, heat of the LED lamps 220 does not need to be dissipated, but needs to be kept. Meanwhile, the first elastic body 110 is softened and has stretchability. The first elastic body 110 is moved downward. That is, the first elastic body 110 drives the heat dissipation 120g to move toward a direction away from the LED lamps 220, thereby driving the heat dissipation 120 to be away from the backplate 210. The heat dissipation apparatus 120 stops dissipating heat of the LED lamps 220. The component 100 for dissipating heat of the device enters a heat insulation state. Meanwhile, the distance between the main body 121 of the heat dissipation apparatus 120 and the corresponding surface of the backplate 210 is H2, and H2>H1. Moreover, the first elastic body 110 can also prevent external cold air from contacting the backplate 210 at a certain degree, thereby realizing heat insulation.

Figure 4:
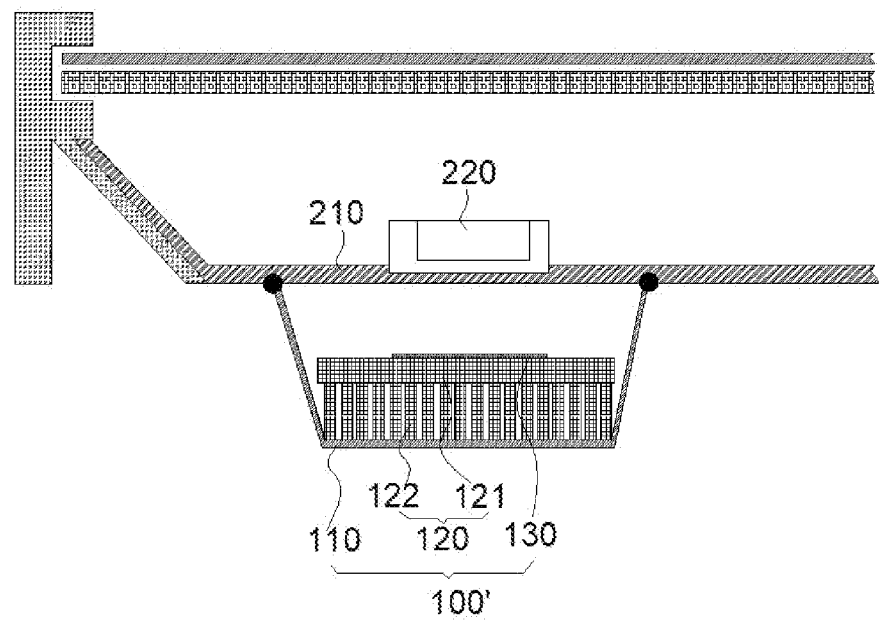
FIG. 4 is a structural schematic view showing a component for dissipating heat of a device according to another embodiment of the present disclosure.

In another embodiment of the present disclosure, as shown in FIG. 4, a component 100' for dissipating heat of a device further includes a hydrogel 130. The hydrogel 130 is disposed on a surface of the heat dissipation apparatus 120 away from the first elastic body 110. Specifically, the hydrogel 130 is disposed on a surface of a main body 121 of the heat dissipation apparatus 120 away from the backplate 210. The hydrogel 130 forms a hydrogel layer on a surface of the main body 121. The hydrogel 130 is a temperature sensing heat dissipation hydrogel that has polyacrylamide as a framework, lithium ions, and bromide ions. The hydrogel 130 is translucent and has good mechanical performance and a relatively high moisture content. In addition, the hydrogel 130 is stable in an environmental condition. Therefore, the hydrogel 130 can retain its shape and moisture content for a long time in the environmental condition. Therefore, an issue of conventional hydrogel becoming dried in the environmental condition due to continuous dehydration is solved. The hydrogel layer formed from the hydrogel 130 has two vital thermal properties, one is: it can retain its moisture content in the environmental condition, the other is: when a temperature is raised, the hydrogel layer will lose some moisture due to evaporation, thereby dissipating heat; when a temperature is decreased, the hydrogel layer will absorb moisture from air to restore to its initial state. The hydrogel 130 has a strong passive capability to dissipate heat due to thermodynamic cycle of evaporation and absorption of moisture. Therefore, the hydrogel 130 can not only reuse waste heat but also effectively dissipate heat, thereby keeping the device working at low temperatures.

As shown in FIG. 4. Specifically, in the present embodiment, when a temperature of the LED lamps 220 corresponding to the component 100' for dissipating heat of the device is equal to the second temperature threshold T2 (critical transition temperature of the hydrogel 130), the hydrogel layer formed from the hydrogel 130 is in a normal state, meaning that the hydrogel layer retains its shape and moisture content. The component 100' for dissipating heat of the device is in a normal state.

The second temperature threshold T2 is almost equal to the first temperature threshold T1. That is, an absolute value of a difference between the first temperature threshold T1 and the second temperature threshold T2 ranges from 0° C. to 1° C.

Figure 5:
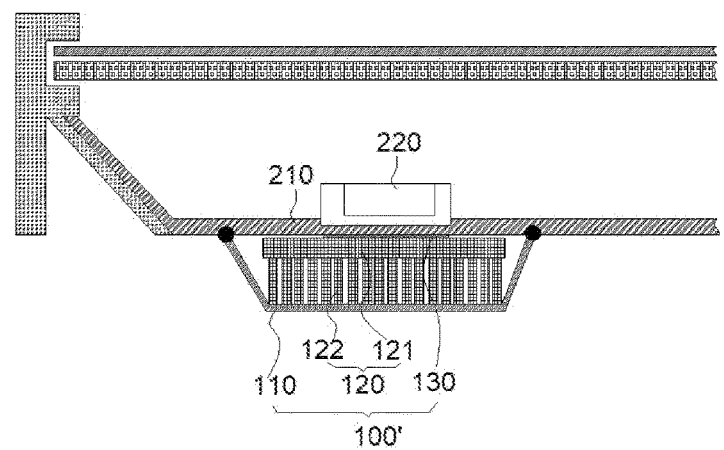
FIG. 5 is a structural schematic view showing the component for dissipating heat of the device according to another embodiment of the present disclosure during a heat dissipation process.

As shown in FIG. 5, when a temperature of the LED lamps 220 corresponding to the component 100' for dissipating heat of the device is higher than the temperature threshold T2, the hydrogel 130 can automatically release its moisture to dissipate heat, thereby reducing a surrounding temperature of the LED lamps 220. Since the temperature threshold T2 is almost equal to the temperature threshold T1, the first elastic body 110 is hardened and shrunk. Therefore, the first elastic body 110 drives the hydrogel 130 disposed thereon to move upward. The hydrogel 130 is attached to the backplate 210. Moisture released from the hydrogel 130 can well dissipate heat. The component 100' for dissipating heat of the device enters a heat dissipation state.

Figure 6:
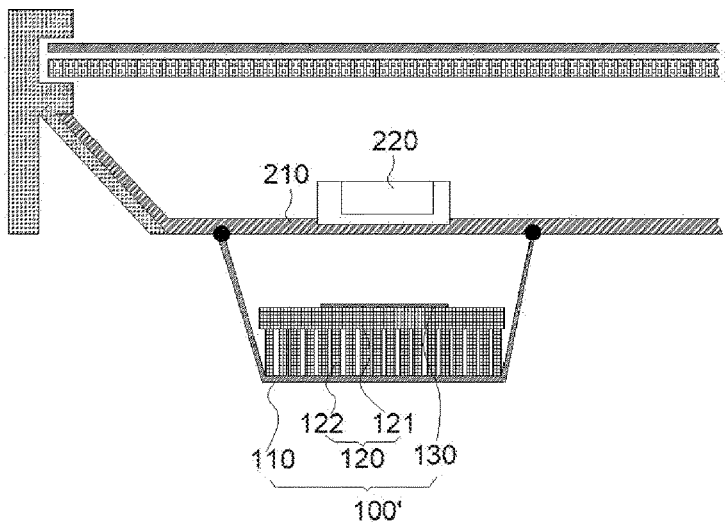
FIG. 6 is a structural schematic view showing the component for dissipating heat of the device according to another embodiment of the present disclosure during a heat insulation process.

As shown in FIG. 6, when a temperature of the LED lamps 220 corresponding to the component 100' for dissipating heat of the device is lower than the temperature threshold T2, heat of the LED lamps 220 does not need to be dissipated, but needs to be kept. The hydrogel 130 stop releasing its moisture and automatically absorb moisture from air surrounding the hydrogel 130, thereby replenishing water. When the temperature threshold T2 is almost equal to the temperature threshold T1 the first elastic body 110 is softened. The hydrogel 130 is moved downward following the heat dissipation apparatus 120, and an interval is formed between the hydrogel 130 and the backplate 210. Therefore, the hydrogel 130 can better absorb moisture from surrounding air. The component 100' for dissipating heat of the device enters a heat insulation state.

In the present embodiment, the hydrogel 130 includes following substances: an acrylamide monomer, a cross-linking agent, and an ultraviolet (UV) photoinitiator, wherein a molar ratio of the acrylamide monomer, the cross-linking agent, and the UV photoinitiator is 2000:1:2.

A method of manufacturing the hydrogel 130 includes following steps:

first, providing an initial reaction mixing solution including: 2 mol/L of acrylamide (AAM) as a monomer, 0.001 mol/L of N,N'-methylenebis(acrylamide) as a cross-linking monomer, and 0.002 mol/L of 2-hydroxy-4'-(2-hydroxyethoxy)-2-methylpropiophenone as a UV photoinitiator. Then, pouring the solution into a film forming container, and irradiating the solution with 365 nm UV light with a power of about 4 mW/cm$^2$ for 8 hours at about 25° C. under protection of 99.99% purity nitrogen, thereby obtaining polyacrylamide (PAAM) hydrogel. Then, immersing the PAAM hydrogel in deionized water until the PAAM hydrogel is completely swelled, and drying the PAAM hydrogel in air at 65° C. until the PAAM hydrogel is dehydrated. After that, immersing the PAAM hydrogel in a mixing solution including 0.1 mol/L of $K_4Fe(CN)_6$ or $K_3Fe(CN)_6$ and 5.4 mol/L of lithium bromide until the PAAM hydrogel is completely swelled, thereby obtaining the hydrogel 130.

Figure 7:
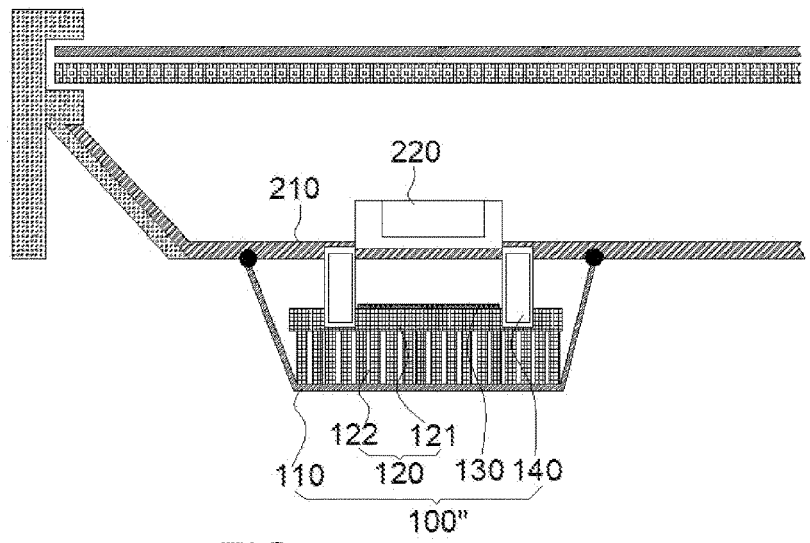
FIG. 7 is a structural schematic view showing a component for dissipating heat of a device according to yet another embodiment of the present disclosure.

In one embodiment of the present disclosure, as shown in FIG. 7, a component 100" for dissipating heat of the device further includes a second elastic body 140. Specifically, an end of the second elastic body 140 is connected to a lateral wall of the main body 121 of the heat dissipation apparatus 120. When the component 100" for dissipating heat of the device is disposed on the backplate 210, another end of the second elastic body 140 is connected to a lateral wall of the backplate 210. Specifically, the second elastic body 140 includes a negative thermal expansion (NTE) material. The NTE material includes a third temperature threshold T3 (phase transition temperature). When a temperature of the second elastic body 140 is higher than the third temperature threshold T3, the second elastic body 140 can be automatically shrunk. When a temperature of the second elastic body 140 is lower than the third temperature threshold T3, the second elastic body 140 can be automatically expanded.

As shown in FIG. 7. Specifically, in the present embodiment, when a temperature of the LED lamps 220 corresponding to the component 100" for dissipating heat of the device is equal to the temperature threshold T3 (phase transition temperature of the second elastic body 140), the second elastic body 140 is in a normal state, meaning that the second elastic body 140 is neither expanded nor shrunk. The component 100" for dissipating heat of the device is in a normal state.

The third temperature threshold T3 is almost equal to the second temperature threshold T2 and is almost equal to the first temperature threshold T1. That is, an absolute value of a difference between the third temperature threshold T3 and the first temperature threshold T1 ranges from 0° C. to 1° C.

Figure 8:
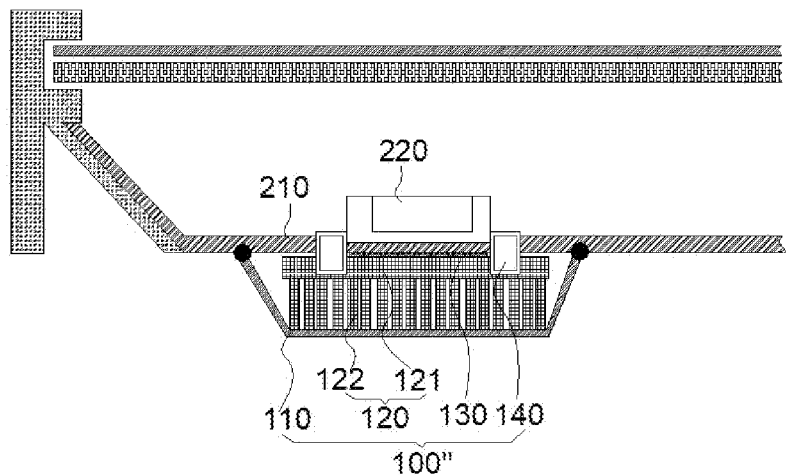
FIG. 8 is a structural schematic view showing the component for dissipating heat of the device according to yet another embodiment of the present disclosure during a heat dissipation process.

As shown in FIG. 8, when a temperature of LED lamps 220 corresponding to the component 100" for dissipating heat of the device is higher than the third temperature threshold T3, heat of the LED lamps 220 needs to be dissipated. The second elastic body 140 is shrunk. Since the third temperature threshold T3 is almost equal to the second temperature threshold T2 and is almost equal to the first temperature threshold T1. When the second elastic body 140 is shrunk, the second elastic body 140 and the first elastic body 110 together drive the heat dissipation apparatus 120 and the hydrogel 130 disposed in the heat dissipation apparatus 120 to move upward. That is, the second elastic body 140 drives the heat dissipation apparatus 120 to move toward a direction close to the LED lamps 220. Therefore, the hydrogel 130 and the main body 121 is closely attached to the backplate 210, thereby fully dissipating heat. The component 100" for dissipating heat of the device enters a heat dissipation state.

Figure 9:
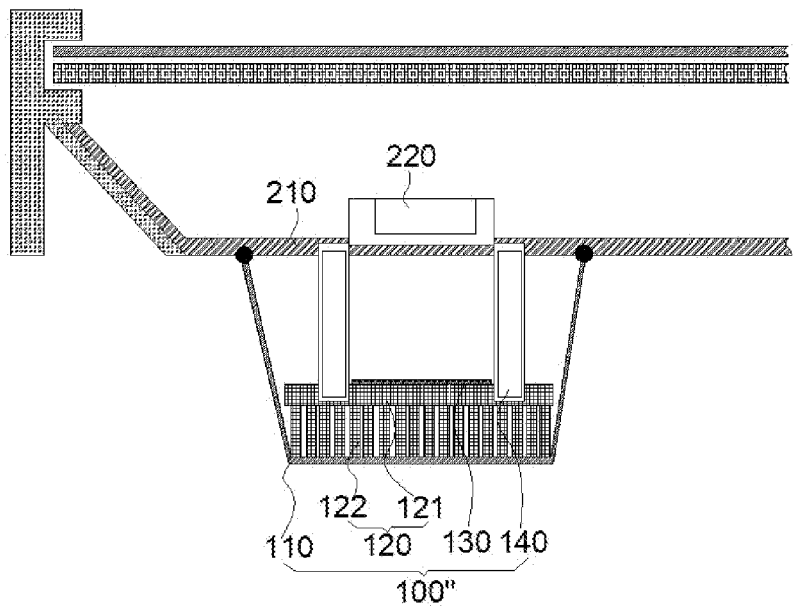
FIG. 9 is a structural schematic view showing the component for dissipating heat of the device according to yet another embodiment of the present disclosure during a heat insulation process.

As shown in FIG. 9, when a temperature of the LED lamps 220 corresponding to the component 100" for dissipating heat of the device is lower than the third temperature threshold T3, heat of the LED lamps 220 does not need to be dissipated, but needs to be kept. The second elastic body 140 is expanded. Since the third temperature threshold T3 is almost equal to the first temperature threshold T1, the first elastic body 110 is softened. A push force applied to the heat dissipation apparatus 120 due to expansion of the second elastic body 140 makes the heat dissipation apparatus 120 be away from the backplate 210. That is, the second elastic body 140 drives the heat dissipation apparatus 120 to move toward a direction away from the LED lamps 220. The component 100" for dissipating heat of the device enters a heat insulation state.

In the present embodiment, the second elastic body 140 includes following substances: polycrystalline powder, an epoxy resin, and a curing agent. The polycrystalline powder comprises a polycrystalline product and a wet medium, the polycrystalline product comprises gallium, manganese, and manganese nitride, and a molar ratio of the gallium, the manganese, and the manganese nitride is 1:2:1

Specifically, a method of manufacturing the second elastic body 140 includes following steps:

first, manufacturing a polycrystalline product of $GaNMn_3$ by a direct solid-state reaction, completely mixing metals of Ga and Mn and powder of Mn2N with a molar ratio of 1:2:1, sealing them in a vacuum quartz tube (106 Torr), sintering them at 750° C. for 3 days, and annealing them at 800° C. for 5 days. After the vacuum quartz tube is cooled to a room temperature, ball-milling the product, sealing the product in the vacuum quartz tube (160 Torr) again, and sintering the product at 800° C. for 8 days, thereby obtaining the required polycrystalline product of $GaNMn_3$. Crushing the polycrystalline product of $GaNMn_3$ to be polycrystalline powder, adding the polycrystalline powder into a stainless steel vial filled with Ar gas, adding small zirconia balls and alcohol (wet medium) into the stainless steel vial under an Ar gas environment, wherein a molar ratio of the small zirconia balls, the polycrystalline powder of $GaNMn_3$, and the alcohol is 5:1:0.6. Then, ball-milling them with a high power planetary activator at a constant speed of 200 rpm for 10 hours, thereby obtaining GaNMn3 powder with small particles (average parameter of the particles is 0.7 μm), A small particle material is beneficial for evenly mixing, and property stability of a composite material structure is improved. After that, using the GaNMn3 powder with small particles as a filling agent (91% to 97% of volume fraction when being added), mixing it with a bisphenol A epoxy resin (type: E51), magnetic stirring them under 363 KPa for 1 hour, adding a curing agent of 4,4'-diaminodiphenylsulfone (DDS) into them, and stirring them under 393 KPa for 4 hours. Finally, pouring a final mixture into a mould that is preheated, performing a degassing process for 2 hours, and performing a curing process under 443 KPa for 3 hours, thereby forming the required NTE material (second elastic body 140), To make an improvement, a spring (not shown) is disposed in the second elastic body 140. Contraction or expansion of the second elastic body 140 can drive the spring disposed therein to be shrunk or expanded as well, and a reaction force of the spring due to deformation will also increase strength of contraction and expansion of the second elastic body 140.

The above are merely preferred embodiments of the present invention. It is understood that many changes and modifications to the described embodiments can be carried out without departing from the scope and the spirit of the disclosure that is intended to be limited only by the appended claims.

What is claimed is:

1. A component for dissipating heat of a device, comprising:
    a first elastic body;
    a heat dissipation apparatus disposed on the first elastic body, wherein the first elastic body supports the heat dissipation apparatus; and
    a hydrogel disposed on a surface of the heat dissipation apparatus away from the first elastic body;
    wherein when a temperature is higher than a first temperature threshold, the first elastic body drives the heat dissipation apparatus to move toward a direction close to a heat supplier;
    when a temperature is lower than the first temperature threshold, the first elastic body drives the heat dissipation apparatus to move toward a direction away from the heat supplier;
    wherein when the temperature is higher than a second temperature threshold, moisture of the hydrogel is released to dissipate heat; and
    when the temperature is lower than the second temperature threshold, the hydrogel stops releasing moisture.

2. The component for dissipating heat of the device of claim 1, wherein the first elastic body is a memory liquid crystal elastic body.

3. The component for dissipating heat of the device of claim 1, wherein an absolute value of a difference between the second temperature threshold and the first temperature threshold ranges from 0° C. to 1° C.

4. The component for dissipating heat of the device of claim 1, wherein the hydrogel comprises following substances: an acrylamide monomer, a cross-linking agent, and an ultraviolet (UV) photoinitiator, wherein a molar ratio of the acrylamide monomer, the cross-linking agent, and the UV photoinitiator is 2000:1:2.

5. The component for dissipating heat of the device of claim 4,
    wherein a method of manufacturing the hydrogel comprises following steps:
        obtaining a mixing solution comprising the substances of the hydrogel;
        irradiating the mixing solution with UV light to obtain acrylamide hydrogel;
        immersing the acrylamide hydrogel in deionized water until the acrylamide hydrogel is completely swelled;
        drying the swelled acrylamide hydrogel until the swelled acrylamide hydrogel is dehydrated; and
        immersing the dehydrated acrylamide hydrogel in a mixing solution comprising potassium ferricyanide and lithium bromide or in a mixing solution comprising potassium ferrocyanide and lithium bromide until the dehydrated acrylamide hydrogel is completely swelled.

6. The component for dissipating heat of the device of claim 1, comprising:
    at least one second elastic body disposed on a surface of the heat dissipation apparatus away from the first elastic body;
    wherein when a temperature is higher than a third temperature threshold, the at least one second elastic body drives the heat dissipation apparatus to move toward a direction close to the heat supplier; and
    when a temperature is lower than the third temperature threshold, the at least one second elastic body drives the heat dissipation apparatus to move toward a direction away from the heat supplier.

7. The component for dissipating heat of the device of claim 6, wherein the at least one second elastic body comprises a negative thermal expansion (NTE) material.

8. The component for dissipating heat of the device of claim 6, wherein an absolute value of a difference between the third temperature threshold and the first temperature threshold ranges from 0° C. to 1° C.

9. The component for dissipating heat of the device of claim 7, wherein the NTE material comprises following substances: polycrystalline powder, an epoxy resin, and a curing agent, the polycrystalline powder comprises a polycrystalline product and a wet medium, the polycrystalline product comprises gallium, manganese, and manganese nitride, and a molar ratio of the gallium, the manganese, and the manganese nitride is 1:2:1.

10. The component for dissipating heat of the device of claim 7, wherein the wet medium comprises zirconia and alcohol.

11. The component for dissipating heat of the device of claim 10, wherein a method of manufacturing the NTE material comprises following steps:
    obtaining a mixing material comprising the substances of the NTE material;
    sintering and annealing the mixing material under a vacuum condition and a hermetic seal condition;
    cooling the mixing material to a room temperature, grinding the mixing material, and sintering the mixing material under a vacuum condition and a hermetic seal condition to form the polycrystalline product;
    mixing the polycrystalline product with the wet medium, and performing a ball-milling process to obtain the polycrystalline powder; and
    mixing the polycrystalline powder with the epoxy resin, and performing a stirring process, a degassing process, and a curing process to obtain the NTE material.

12. A backlight module, comprising a backplate, a plurality of light-emitting diode (LED) lamps disposed on a surface of the backplate, and at least one component for dissipating heat of a device disposed on a surface of the backplate away from the LED lamps, wherein each of the at least one component for dissipating heat of the device corresponds to one of the LED lamps; and
    wherein the at least one component for dissipating heat of the device comprises:
    a first elastic body;
    a heat dissipation apparatus disposed on the first elastic body, wherein the first elastic body supports the heat dissipation apparatus; and
    a hydrogel disposed on a surface of the heat dissipation apparatus away from the first elastic body;
    wherein when a temperature is higher than a first temperature threshold, the first elastic body drives the heat dissipation apparatus to move toward a direction close to a heat supplier;
    when a temperature is lower than the first temperature threshold, the first elastic body drives the heat dissipation apparatus to move toward a direction away from the heat supplier;

wherein when the temperature is higher than a second temperature threshold, moisture of the hydrogel is released to dissipate heat; and when the temperature is lower than the second temperature threshold, the hydrogel stops releasing moisture.

13. The backlight module of claim 12, wherein the first elastic body is a memory liquid crystal elastic body.

14. The backlight module of claim 12, wherein the at least one component for dissipating heat of the device comprises:

at least one second elastic body disposed on a surface of the heat dissipation apparatus away from the first elastic body;

wherein when a temperature is higher than a third temperature threshold, the at least one second elastic body drives the heat dissipation apparatus to move toward a direction close to the heat supplier; and when a temperature is lower than the third temperature threshold, the at least one second elastic body drives the heat dissipation apparatus to move toward a direction away from the heat supplier.

15. A display panel, comprising a backlight module, wherein the backlight module comprises a backplate, a plurality of light-emitting diode (LED) lamps disposed on a surface of the backplate, and at least one component for dissipating heat of a device disposed on a surface of the backplate away from the LED lamps, wherein each of the at least one component for dissipating heat of the device corresponds to one of the LED lamps; and a first elastic body;

a heat dissipation apparatus disposed on the first elastic body, wherein the first elastic body supports the heat dissipation apparatus; and a hydrogel disposed on a surface of the heat dissipation apparatus away from the first elastic body;

wherein when a temperature is higher than a first temperature threshold, the first elastic body drives the heat dissipation apparatus to move toward a direction close to a heat supplier;

when a temperature is lower than the first temperature threshold, the first elastic body drives the heat dissipation apparatus to move toward a direction away from the heat supplier;

wherein when a temperature is higher than a second temperature threshold, moisture of the hydrogel is released to dissipate heat; and when a temperature is lower than the second temperature threshold, the hydrogel stops releasing moisture.

16. The display panel of claim 15, wherein the first elastic body is a memory liquid crystal elastic body.

17. The display panel of claim 15, wherein the at least one component for dissipating heat of the device comprises:

at least one second elastic body disposed on a surface of the heat dissipation apparatus away from the first elastic body;

wherein when a temperature is higher than a third temperature threshold, the at least one second elastic body drives the heat dissipation apparatus to move toward a direction close to the heat supplier; and when a temperature is lower than the third temperature threshold, the at least one second elastic body drives the heat dissipation apparatus to move toward a direction away from the heat supplier.

* * * * *